(12) United States Patent
Claussen et al.

(10) Patent No.: US 9,764,500 B2
(45) Date of Patent: *Sep. 19, 2017

(54) VENT APPARATUS

(71) Applicant: Claussen Technology, LLC, Naples, FL (US)

(72) Inventors: Steven W. Claussen, Glenwood, MN (US); Kurtis Lee McCuen, Benson, MN (US)

(73) Assignee: CLAUSSEN TECHNOLOGY, LLC, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,027

(22) Filed: Aug. 29, 2016

(65) Prior Publication Data

US 2016/0361842 A1 Dec. 15, 2016

Related U.S. Application Data

(63) Continuation of application No. 14/875,557, filed on Oct. 5, 2015, which is a continuation of application No. 14/213,567, filed on Mar. 14, 2014, now Pat. No. 9,149,957.

(60) Provisional application No. 61/791,072, filed on Mar. 15, 2013.

(51) Int. Cl.
| | |
|---|---|
| *B29C 33/10* | (2006.01) |
| *B29C 41/04* | (2006.01) |
| *B29C 41/34* | (2006.01) |
| *B29C 41/38* | (2006.01) |

(52) U.S. Cl.
CPC ............ *B29C 33/10* (2013.01); *B29C 41/042* (2013.01); *B29C 41/34* (2013.01); *B29C 41/38* (2013.01); *B29C 41/04* (2013.01); *B29K 2827/18* (2013.01); *B29K 2883/00* (2013.01)

(58) Field of Classification Search
CPC ................................ B29C 33/10; B29C 41/04
USPC .......................... 425/435, 472, 812; 249/141
See application file for complete search history.

(56) References Cited

U.S. PATENT DOCUMENTS

| | | |
|---|---|---|
| 4,081,225 A | 3/1978 | Yaita |
| 7,165,964 B2 | 1/2007 | Schuessler |
| 9,149,957 B2 | 10/2015 | Claussen |
| 2005/0167887 A1 | 8/2005 | Jones |
| 2006/0180951 A1 | 8/2006 | Wolfe et al. |

OTHER PUBLICATIONS

Declaration Regarding vent Tube Plug Product Known Prior to Jan. 2012; 4 pages. Jan. 21, 2015.

*Primary Examiner* — James Mackey
(74) *Attorney, Agent, or Firm* — Mueting, Raasch & Gebhardt, P.A.

(57) ABSTRACT

A vent apparatus for use in a mold defining an opening that includes a vent tube portion configured to extend through the opening of the mold and a secondary tube portion configured to mate with the first end portion of the vent tube portion. For example, the secondary tube portion may be used to seal the passageway at the first end portion and may define one or more membrane regions configured to melt during a mold process to unseal the passageway.

20 Claims, 17 Drawing Sheets

VENT APPARATUS

CROSS-REFERENCE TO RELATED APPLICATION

This application is a continuation application of U.S. patent application Ser. No. 14/875,557, filed on Oct. 5, 2015, which is a continuation application of U.S. patent application Ser. No. 14/213,567, filed on Mar. 14, 2014, which claims the benefit of U.S. Provisional Patent Application Ser. No. 61/791,072 filed on Mar. 15, 2013, all of which are incorporated by reference herein in their entireties.

BACKGROUND

The present disclosure relates to vent apparatus for use in venting the inside of a rotational mold to outside of the mold.

Rotational molding involves heating a flowable material in a hollow mold and rotating the mold to melt and distribute the material over the inside of the mold. Rotational molding is a high temperature, low pressure process and the strength required from the molds is minimal, which results in its ability to produce large, complex parts using a low-cost mold. Further, the low processing pressure involved in rotational molding has the added advantage of producing parts that are virtually stress free.

Rotational molded articles are used for many different commercial or consumer purposes including but not limited to livestock feeders, drainage systems, food service containers, instrument housings, fuel tanks, vending machines, highway barriers, road markers, boats, kayaks, childcare seats, light globes, tool carts, planter pots, playing balls, playground equipment, headrests, truck/cart liners, and air ducts.

The process of rotational molding generally includes placing a flowable material such as, e.g., a polymer usually in a powder form, inside a mold. Often, the mold is composed of two or more parts and totally encloses the powder. Molds may be made out of steel, aluminum, and/or another metal and may be supported by a steel frame. The mold is then placed in an oven and heated for a predetermined amount of time to allow the flowable material to turn into a liquid state. The mold is rotated in two perpendicular axes throughout the rotational molding process. As the mold heats up, the flowable material begins to coalesce to the inside walls of the mold. The heat distribution around the inner surface of the mold may be determined by the outside design of the mold. For example, tin may be used to reduce heat in areas and gas lines may be used to radiate, or deliver, more heat on, or to, other areas similar to a convection oven.

Centrifugal forces additionally contribute to the accumulation of the flowable material around the inside of the mold (e.g., such centrifugal forces may constantly pull the material against the inside surface of the mold as the mold is rotated about the two respective axes). After a selected period of time, the mold may be cooled. Rotation of the mold may continue throughout the cooling process. Once the flowable material (e.g., polymer) has hardened (after the cooling process has completed), rotation can stop, the mold may be opened, and the mold part can be removed from the mold.

Along with the flowable material, gases (e.g., air, oxygen, nitrogen, carbon dioxide, etc.) are located inside the mold during the molding process. The gases may exercise significant rates of thermal expansion in comparison to the flowable materials inside the mold. Since the mold may be sealed tight, the pressure inside the mold may fluctuate (e.g., increase and/or decrease) due to the temperature fluctuations of the gases located inside the mold during the heating and cooling steps of the rotational molding process. The pressure fluctuations may cause "blowholes" and/or deformations in the article being molded.

To counter these pressure fluctuations, a "vent tube" may be placed in the mold to allow the inside of the mold to "breathe" to the outside of the mold. In other words, the vent tube may allow the pressure inside of the mold to equalize with the pressure outside of the mold. Typically, a wad of furnace filter or steel wool is placed in the vent tube to prevent any flowable material (e.g., polymer) from falling out of the mold through the vent tube as the mold rotates. Tape may also be used to cover the end of the vent tube located inside of the mold. The wad of furnace filter or steel wool and/or the tape may be burned off after a selected time period during a heating cycling of the rotational molding process such that, e.g., the vent tube can breathe. Often, such practices may result in clogged vent tubes, which may cause a resistance in airflow (e.g., which may cause improper molding or blowholes).

Many molds may not fully seal at the points where the mold comes together (which may be called parting lines). Often, the mold may vent through the parting lines prior to the flowable material solidifying, or hardening, and thereby blocking the parting lines. If airflow in a vent tube is restricted after the parting lines have become blocked, the air pressure inside the mold will rise as the temperature inside the mold rises. Likewise, as the mold begins to cool, the pressure inside the mold will begin to fall as the temperature inside falls. During the cooling process, the gas inside the mold may be sealed from the outside of the mold as the polymer completely coats the entire inside of the mold. If the vent remains restricted, a vacuum may be created within the molded part that may cause "blowholes" along the parting lines as gas tries to enter the mold to relieve the vacuum. Additionally, as the polymer hardens during the cooling process, the vacuum may suck a portion, or part of the molded article away from the mold wall and cause a deformed or "scrap" part.

Vents may be used as one-way valves, which may be reliant on the pressure differential of the gas inside the mold to the gas outside the mold, which may provide a positive pressure inside the mold at the end of the heating cycle such that a vacuum may not be created during the cooling phase. Such one-way valve system may have an inability to control pressure that builds up in the mold. A silicone tube used as a vent tube is disclosed in U.S. Pat. App. Pub. No. 2005/0167887 published Aug. 4, 2004 to Rory Jones, which is incorporated herein by reference in its entirety.

SUMMARY

The present disclosure may include vent apparatus that may be used with a rotational mold. The vent apparatus may include a vent tube portion (e.g., a cylindrical pipe formed of TEFLON, etc.) and a secondary tube portion (e.g., formed of silicone) configured to mate with the vent tube portion. The secondary portion may mate with the vent tube portion multiple different ways and have multiple different shapes and sizes. In at least one embodiment, the secondary portion may define a flat, or planar, surface that extends perpendicular to an axis along which the vent tube portion extends. The flat surface may define one or more, or a plurality, of slits therethrough to allow airflow therethrough in either direction (e.g., from inside the mold to outside of the mold and from outside of the mold to inside of the mold). In at least one embodiment, the secondary tube portion does not exceed the diameter of the vent tube such that when mated, they define the same diameter (e.g., to slide into a vent hole of a mold).

One exemplary vent apparatus may include a silicone tube that can be inserted into a polytetrafluoroethylene (PTFE), or TEFLON, tube that is already in a valve port. Such an embodiment can be a more efficient way of acting as the valve to relieve negative or positive pressure inside of the mold. One or more embodiments described herein may be capable of serving as a two-way valve depending on the function needed during the molding processes (e.g., cooling, heating, etc.).

One exemplary vent apparatus includes a silicone tube defining a valve configured to be inserted in a PTFE tube. The PTFE may be located inside a mold. The valve of the silicone tube may equally support both ingress and egress airflow inside and outside of the mold. In a rotation mold, the valve may support egress airflow when needed as well as ingress airflow when the atmospheric pressure favors ingress or egress airflow respectively.

One exemplary vent apparatus may provide enhanced durability and maximized airflow for longer periods of time. Although the main tube is shown as a PTFE tube, any existing vent tube including PTFE and metal vent tubes may be modified to include the silicone rubber tube therewith. The secondary tube portion may be a molded item that can be defined as a component piece, as a plug, which therefore can act as a valve which will allow ingress or egress airflow dependent on the state of air pressure inside and/or outside the rotational mold.

One exemplary vent apparatus may include a vent tube portion extending from a first end region to a second end region along an axis and defining an opening extending from the first end region to the second end region and a secondary tube portion configured to mate with the first end region of the vent tube portion (e.g., the secondary tube portion may define a surface extending perpendicular to the axis when the secondary tube portion is mated with the first end region, the surface may define a plurality of slits therethrough to allow airflow through the surface from the opening of the vent tube to outside of the surface, etc.).

One or more embodiments of the vent apparatus may include one or more of the following features: a surface of the secondary tube portion may extend perpendicular to the axis and may allow airflow from outside of the surface to flow into the opening of the vent tube portion and may allow airflow from inside the opening of the vent tube portion to outside of the surface substantially equally; the secondary tube portion may be configured to be mated around the outside of the vent tube portion; the secondary tube portion may be configured to be mated in the inside of the vent tube portion; and/or the vent tube portion may define a stepped region configured to mate with the secondary tube portion Another exemplary vent apparatus for use in a mold defining an opening may include a vent tube portion configured to extend through the opening of the mold (e.g., the vent tube portion may extend from a first end region to a second end region along an axis and may define a passageway extending from the first end region to the second end region, wherein the vent tube portion may define an inner surface and an outer surface, etc.) and a secondary tube portion configured to mate with the first end region of the vent tube portion to seal the passageway at the first end region (e.g., the secondary tube portion may include an inner surface and an outer surface along an axis, the inner surface may extend over at least a portion of the outer surface of the vent tube portion, the outer surface may extend within and along at least a portion of the inner surface of the vent tube portion, etc.). The secondary tube portion may further define one or more membrane regions configured to melt during a mold process to unseal the passageway.

One or more embodiments of the vent apparatus may include one or more of the following features: the vent tube portion may define a vent tube outer diameter (e.g., the first end region of the vent tube portion may define a mating region having a mating region outer diameter that is less than the vent tube outer diameter); the first end region of the vent tube portion may define a mating region and the mating region may define a mating region length extending along the axis (e.g., the secondary tube portion may define a secondary tube portion length that is longer than the mating region length); the vent tube portion may define a vent tube outer diameter (e.g., the secondary tube portion may define a secondary tube portion inner diameter that is less than the vent tube outer diameter); the first end region of the vent tube portion may define an annular protrusion extending radially from the outer surface of the vent tube portion configured to engage the secondary tube portion when the secondary tube portion is mated to the first end region; the one or more membrane regions of the secondary tube portion may include a plurality of membrane regions; the one or more membrane regions of the secondary tube portion may include a membrane region extending perpendicular to the axis when the secondary tube portion is mated to the first end region; the one or more membrane regions of the secondary tube portion may include at least one membrane region extending parallel to the axis when the secondary tube portion is mated to the first end region; the secondary tube portion may include a cylindrical body extending from a proximal end region to a distal end region and defining a channel from the proximal end region to the distal end region (e.g., the secondary tube portion may further include an end surface portion covering the channel at the distal end region, wherein the end surface portion may define a membrane region of the one or more membrane regions, etc.); the end surface portion may include only a membrane region at the center thereof; the cylindrical body may define at least one membrane region of the one or more membrane regions; and/or the passageway of the vent tube portion may define an inner cross-section area taken perpendicular to the axis and each of the one or more membrane regions of the secondary tube portion define an area (e.g., a combined area of all of the areas of the one or more membrane regions may be greater than the inner cross-section area of the channel).

One exemplary vent apparatus may be configured for use with a mold defining a cavity and an opening extending into the cavity. The exemplary vent apparatus may include a vent tube portion and a secondary tube portion. The vent tube portion may be configured to be located within the opening of the mold. Further, the vent tube portion may extend from a first end region to a second end region along an axis and may define a passageway extending from the first end region to the second end region configured to allow airflow between the cavity of the mold and outside of the mold. The secondary tube portion may be configured to mate with the first end region of the vent tube portion and may include a valve region that extends perpendicular to the axis when the secondary tube portion is mated with the first end region of the vent tube portion. The valve region may define a plurality of slits therethrough to allow airflow through the valve region from the passageway of the vent tube portion to outside of the valve region.

One exemplary vent apparatus may include a vent tube portion extending from a first end region to a second end region along an axis and defining a passageway extending from the first end region to the second end region. The exemplary vent apparatus may further include a secondary tube portion configured to mate with the first end region of the vent tube portion. The secondary tube portion may include a valve region that extends perpendicular to the axis when the secondary tube portion is mated with the first end region, and the valve region may define a plurality of slits therethrough to allow airflow through the valve region from the passageway of the vent tube portion to outside of the valve region.

In one or more embodiments, the valve region of the secondary tube portion may be configured to restrict airflow in a first direction and a second direction by the same amount of restriction, where the first direction is from outside of the valve region into the passageway of the vent tube portion and the second direction is from inside the passageway of the vent tube portion to outside of the valve region.

One exemplary vent apparatus may include a vent tube portion extending from a first end region to a second end region along an axis and defining a passageway extending from the first end region to the second end region. The exemplary vent apparatus may further include a secondary tube portion extending from a valve region to a insertion region and defining a passageway extending from the valve region to the insertion region. The insertion region may be configured to mate with the first end region of the vent tube portion and the valve region may extend perpendicular to the axis when the insertion region is mated with the first end region. The valve region may be configured to restrict airflow in a first direction and a second direction by the same amount of restriction where the first direction is from outside of the valve region into the passageway of the secondary tube portion and the second direction is from inside the passageway of the secondary tube portion to outside of the valve region.

In one or more embodiments, the vent tube portion may define an outer surface, and the secondary tube portion may be configured to be mated around the outer surface of the vent tube portion. Further, in one or more embodiments, the secondary tube portion may be configured to be mated to the vent tube portion inside the passageway of the vent tube portion.

In one or more embodiments, the valve region may define a surface facing away from the vent tube portion and extending perpendicular to the axis when the secondary tube portion is mated with the first end region of the vent tube portion.

The above summary is not intended to describe each embodiment or every implementation of the present disclosure. A more complete understanding will become apparent and appreciated by referring to the following detailed description and claims taken in conjunction with the accompanying drawings.

DETAILED DESCRIPTION OF EXEMPLARY EMBODIMENTS

In the following detailed description of illustrative embodiments, reference is made to the accompanying figures of the drawings which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus shall be described with reference to FIGS. 1-22. It will be apparent to one skilled in the art that elements from one embodiment may be used in combination with elements of the other embodiments (e.g., mating functionality described with respect to one embodiment may be used in any of the other embodiments), and that the possible embodiments of such apparatus using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

The present disclosure describes vent apparatus configured to be located in an opening in a mold. The vent apparatus may extend from outside of the mold to inside the mold and may be configured to selectively allow gas to move therebetween to, e.g., prevent pressure differentials between the inside and outside of the mold thereby causing blowholes, deformed or scrap parts, and/or other abnormalities.

Figure 1:
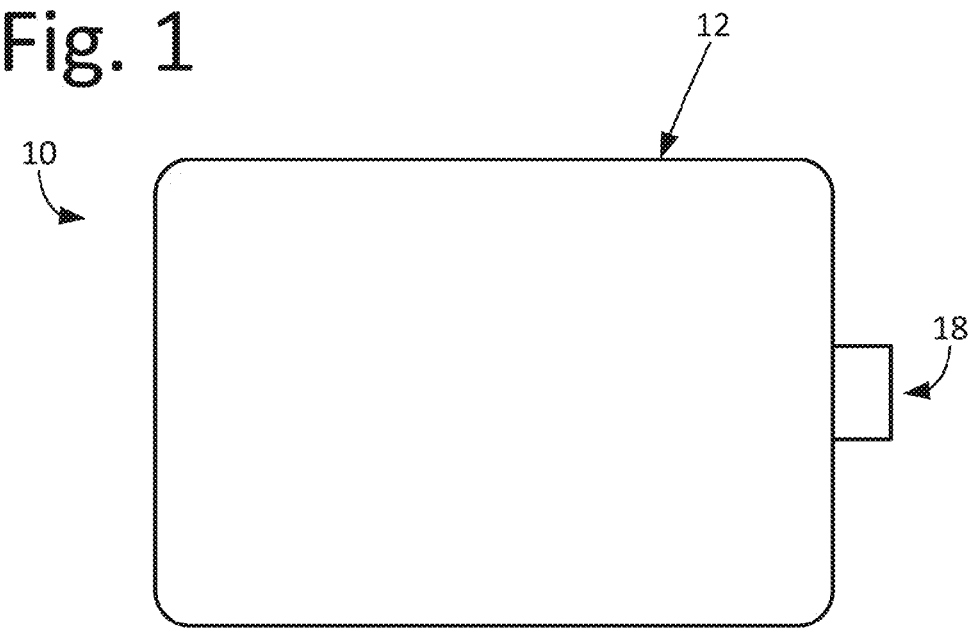
FIG. 1 is a side view of a simple rotational mold that may use a TEFLON tube for ventilation.

The exemplary embodiments will be described herein within reference to a general mold 10 as depicted in FIG. 1. In this example, the mold 10 may define a generally rectangular box-like shape. The mold 10 may include a mold wall 12. The inner surface 14 of the mold wall 12 may define a cavity 16 within which an article may be molded. The mold wall 12 may further define a vent hole 18 extending therethrough. In other words, the vent hole 18 may connect the environment outside of the mold 10 to the cavity 16.

Figure 2:
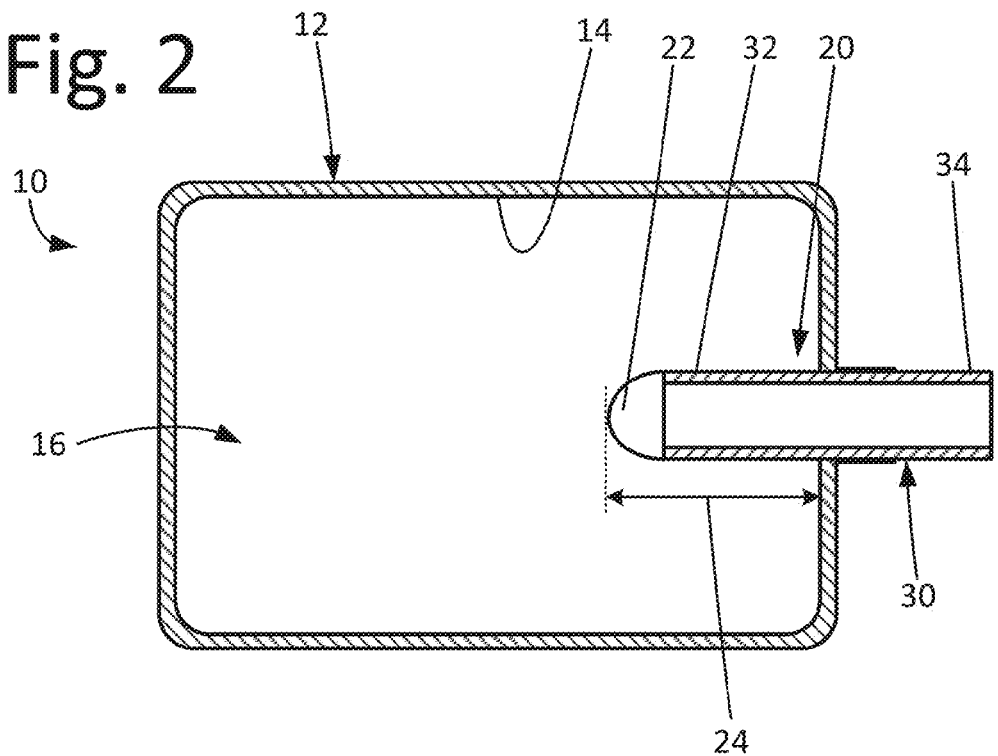
FIG. 2 is a cross-sectional view of an exemplary vent apparatus inserted into the mold of FIG. 1.

As shown in FIG. 2, an exemplary vent apparatus 20 may be located in the opening 18 of the mold 10 (e.g., extending through the opening 18 of the mold 10). The vent apparatus 20 may extend a distance 24 into the cavity 16 measured from the inner surface 14 of the mold wall 12 to a valve region 22 of the vent apparatus 20.

Figure 3:
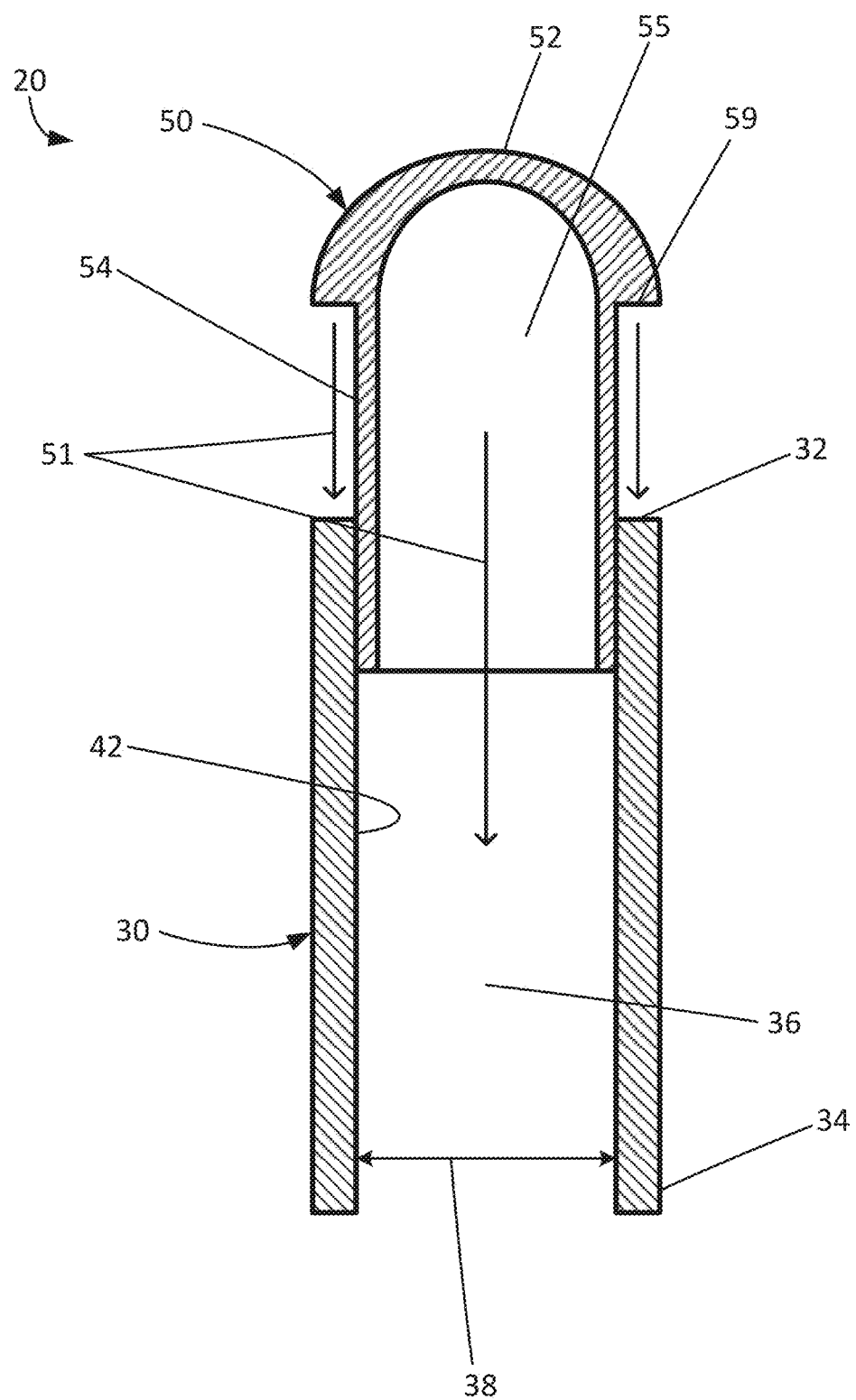
FIG. 3 is a cross-sectional view of an exemplary vent apparatus.

The vent apparatus 20 may include a vent tube portion 30 and a secondary tube portion 50 as shown in the cross-sectional view of FIG. 3. The vent tube portion 30 may be configured to be reused with a mold 10 and the secondary tube portion 50 may be configured for a selected number of uses, such as, e.g., one use, two or more uses, three or more uses, etc.

The vent tube portion 30 may extend from a first end region 32 to a second end region 34 and may define a passageway, or channel, 36 extending from the first end region 32 to the second end region 34. The passageway 36 may be configured for the transmission of gases to and from the cavity 16 of the mold 10. The vent tube portion 30 may have various shapes and/sizes. For example, the vent tube portion 30 may be about 4 inches to about 36 inches such as, e.g., about 5 inches, about 6 inches, about 7 inches, about 8 inches, or any other number through 36 inches. Further, for example, an inside diameter 38 of the vent tube portion 30 may be about 0.5 inches to about 4 inches such as, e.g., about 0.75 inches, about 1 inch, about 1.25 inches, about 1.5 inches, about 1.75 inches, about 2 inches, about 2.5 inches, about 3 inches, about 4 inches, etc.

The vent tube portion 30 may include one or more materials configured to withstand the heat of a molding oven and also configured to not adhere, or stick, to flowable material used within the cavity 16 of the mold 10 to mold an article. For example, the vent tube portion 30 may be formed of PTFE (TEFLON).

Figure 4:
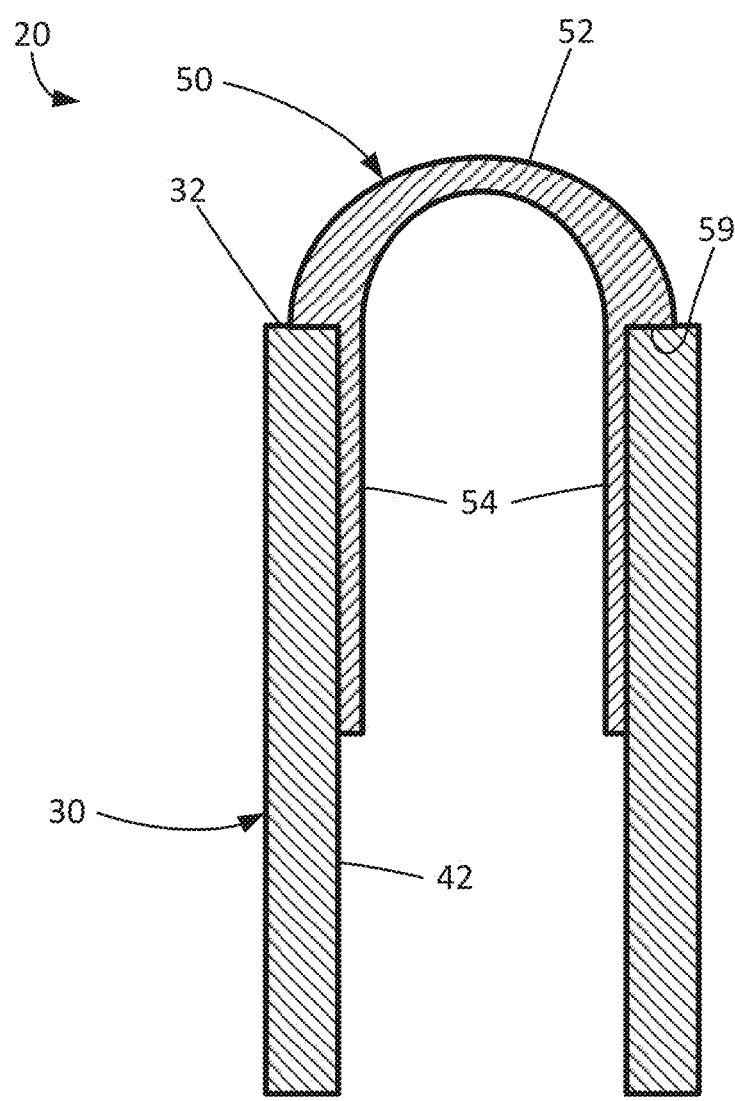
FIG. 4 is a cross-sectional view of the vent apparatus of FIG. 3 showing a vent tube portion and secondary tube portion coupled together.

As shown, and in one embodiment of a vent apparatus, the secondary tube portion 50 of vent apparatus 20 may be inserted into the passageway 36 of the vent tube portion 30 as indicated by arrows 51. The secondary tube portion 50 may include a valve, or tip, portion 52 (e.g., domed valve region, curvilinear valve region, etc.) and a cylindrical portion 54 and a passageway 55 extending therein. The cylindrical portion 54 may be located inside the opening 36 of the vent tube portion 30 while the valve region 52 may be located outside of the vent tube portion 30. The secondary tube portion 50 completely inserted, or coupled to, the vent tube portion 30 is shown in FIG. 4. As shown, a shoulder portion 59 of the secondary tube portion 56 may contact, or be adjacent to, the first end region 32 of the vent tube portion 30 when completely, or fully, inserted.

In this embodiment, the secondary tube portion 50 may remain coupled to vent tube portion 30 (e.g., inserted within the opening) by an interference, or friction, fit between the cylindrical portion 54 of the secondary tube portion 50 and an inner surface 42 of the vent tube portion 30.

The secondary tube portion 50 may include one or more materials configured to melt, or burn off, after a selected amount of time within a molding oven (e.g., after a selected amount of heat has been applied, after a selected amount of time at a selected temperature, etc.). The secondary tube portion 50 may include silicone, polyethylene, polypropylene, and/or any other material (e.g., such as a polymer) with similar thermal properties to that of which is being molded. In at least one embodiment, the secondary tube portion 56 may include two different materials configured to melt, or burn off, at different temperatures levels. Such different materials may be located in different regions of the secondary tube portion 50. In at least one embodiment, the secondary tube portion 50 may be formed entirely of silicone, which may provide a high temperature resistant material to increase the cycle life.

One or more slits 58 may extend through the valve region 52 of the secondary tube portion 50 as shown in FIGS. 5-8. The slits 58 may be configured to allow gases to flow therethrough. The shape (e.g., curved, domed, biased in one direction, etc.) of the valve region 52 may allow gas to flow into the cavity 16 of the mold 10 easier than flowing out of the cavity 16. The slits 58 are shown opened in FIGS. 9-10.

Figure 11:
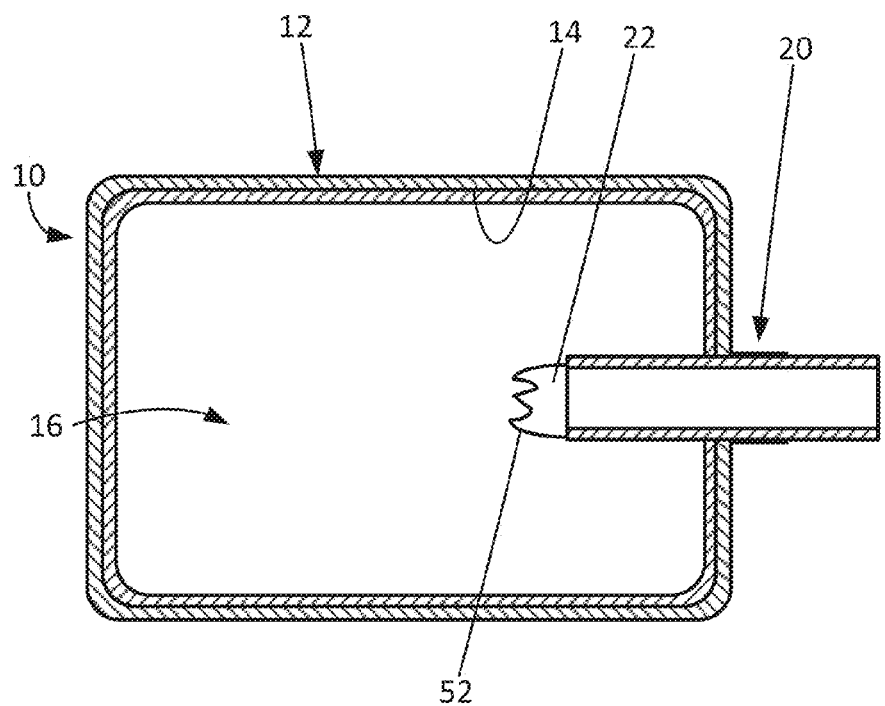
FIG. 11 is a cross-sectional view an exemplary vent apparatus inserted into the mold of FIG. 1 with the secondary tube portion after being opened to allow airflow therethrough.

The mold 10 with a flowable material 11 such as, e.g., a polymer, coalesced to the inner surface 14 of the mold wall 12 is shown in FIG. 11. Further, the secondary tube portion 50 is shown with the slits 58 open and configured for gases to flow into and out of the cavity 16 of the mold 10.

The exemplary vent apparatus may control the airflow of gasses into and out of a mold. For example, the exemplary vent apparatus may be configured to allow gas to flow into and out of the cavity of a mold with substantially the same, or equal amount of, restriction. Further, for example, a secondary tube portion may be configured to allow openings such as, e.g., slits, etc., to open in either direction (into or out of the mold cavity) depending on which area (inside the cavity or outside the cavity) has higher pressure. In other words, the secondary tube portion may be configured to provide two-way valve functionality that is not biased in either direction and airflow may be restricted by the secondary tube portion in either direction by the same amount of restriction or control.

Figure 12:
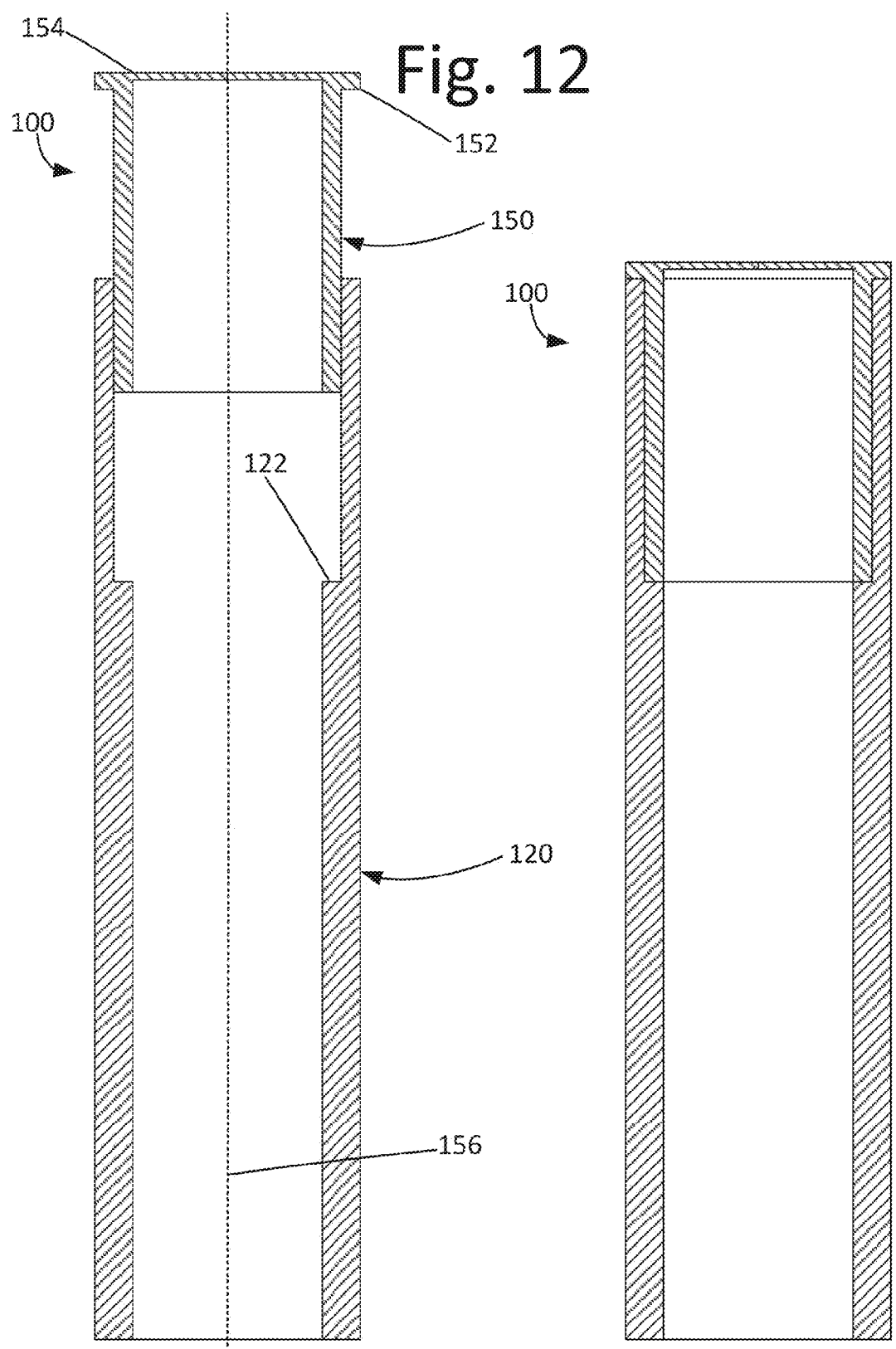
FIGS. 12-15 are a cross sectional views of exemplary vent apparatuses.

FIG. 12 includes two cross-sectional views of exemplary vent apparatus 100. The vent apparatus 100 may include a vent tube portion 120 extending from a first end region 124 to a second end region 126 and defining a passageway 125 extending from the first end region 124 to the second end region 126. The vent apparatus 100 may further include a secondary tube portion 150 that extends from an insertion region 157 to a valve region 158 and defines a passageway 159 extending from the insertion region 157 to the valve region 158.

As shown, a secondary tube portion 150 may be coupled, or mated, to (e.g., slide into) the first end region 124 of the vent tube portion 120. More specifically, the insertion region 157 of the secondary tube portion 150 may be located inside at least a part of the passageway 125 of the first end region 124 of the vent tube portion 120. The inner surface 127 of the vent tube portion 120 may contact an outer surface of the insertion region 157 of the secondary tube portion 150. To restrict movement of the secondary tube portion 150 with respect to the vent tube portion 120 (e.g., to keep the secondary tube portion 150 from sliding down the passageway 125 of the vent tube portion 120), the vent tube portion 120 may define a larger inner diameter extending from the first end region 125 and smaller inner diameter forming a step structure 122 upon which at least part (e.g., the end or edge) of the insertion region 157 of the secondary tube portion 150 may contact or nest. For example, the secondary tube portion 150 and the vent tube portion 120 may be sized such that the secondary tube portion 150 may nest, or mate with the vent tube portion 120. The step structure 122 created inside the vent tube portion 122 as well as a lip 152 of the valve region 128 of the secondary tube portion 150 (e.g., which may seat on the end or rim 128 of the vent tube portion 120) may restrict, or restrain, movement of the secondary tube portion 150 (e.g., such that the secondary tube portion 150 does not move after being nested within the vent tube portion 120).

Figure 5:
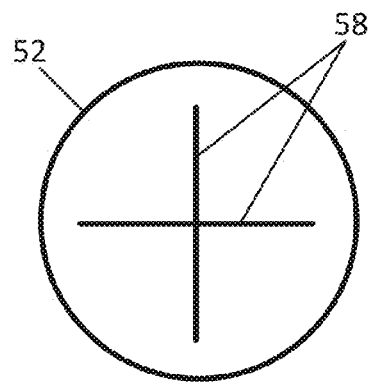
FIGS. 5-6 are diagrammatic overhead views of exemplary secondary tube portions.
Figure 6:
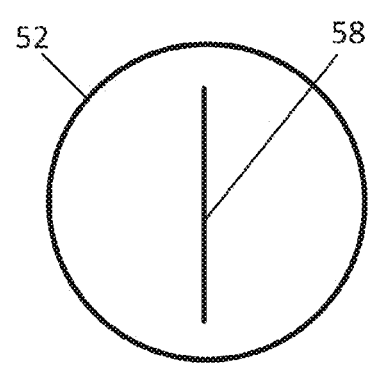
Figure 7:
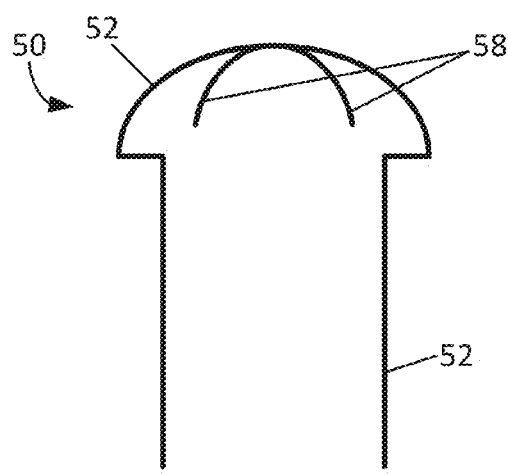
FIGS. 7-8 are side views of exemplary secondary tube portions.
Figure 8:
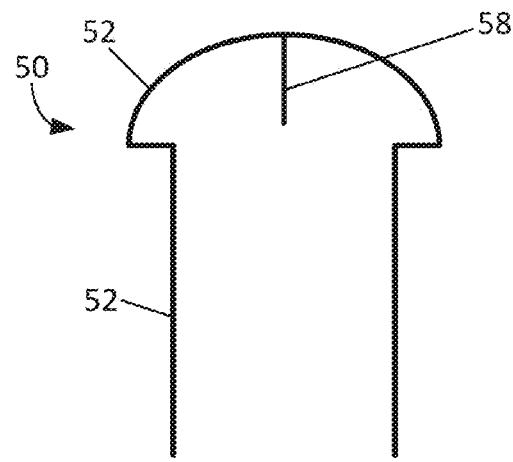
Figure 9:
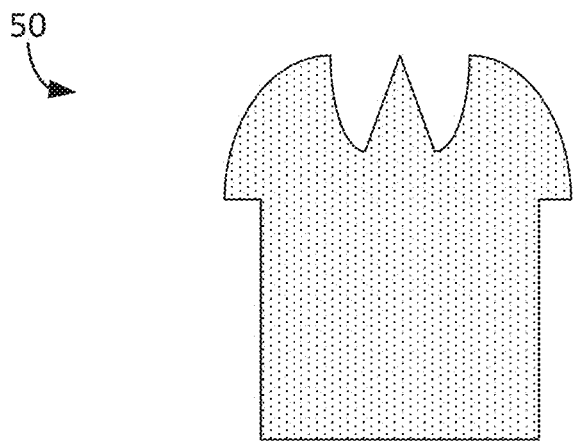
FIGS. 9-10 are side views of exemplary secondary tube portions after opening to allow airflow therethrough.
Figure 10:
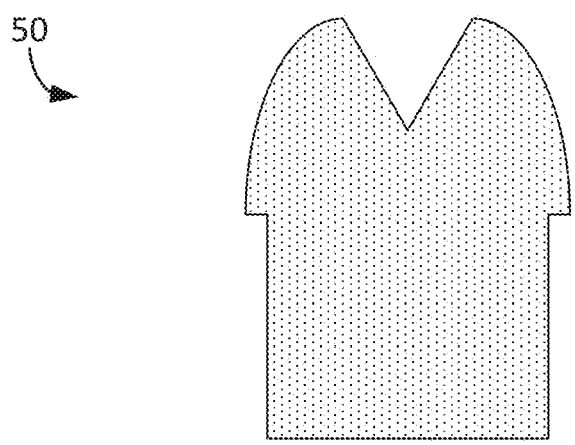
Figure 16:
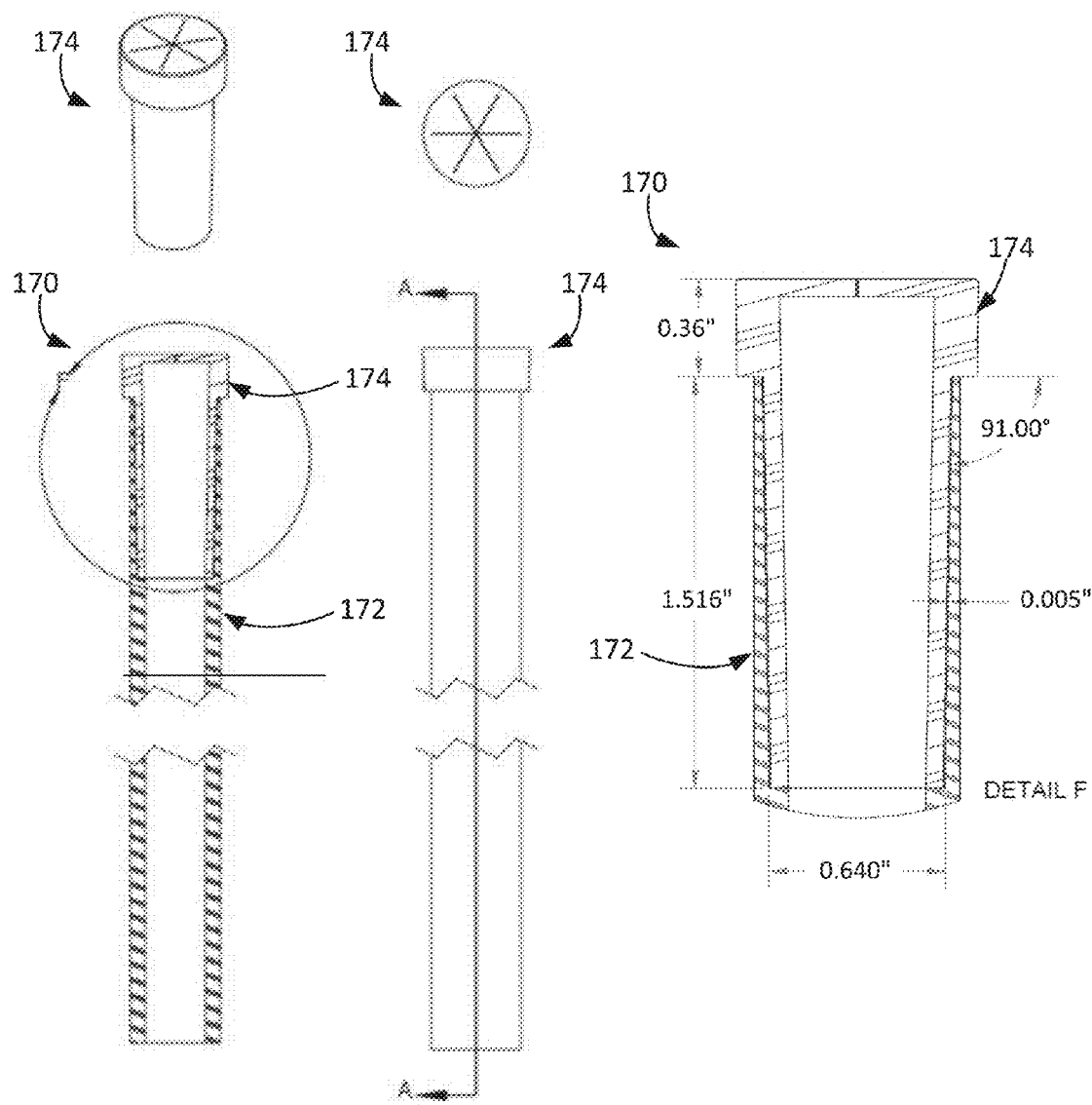
FIGS. 16-18 include multiple views of exemplary vent apparatuses.
Figure 17:
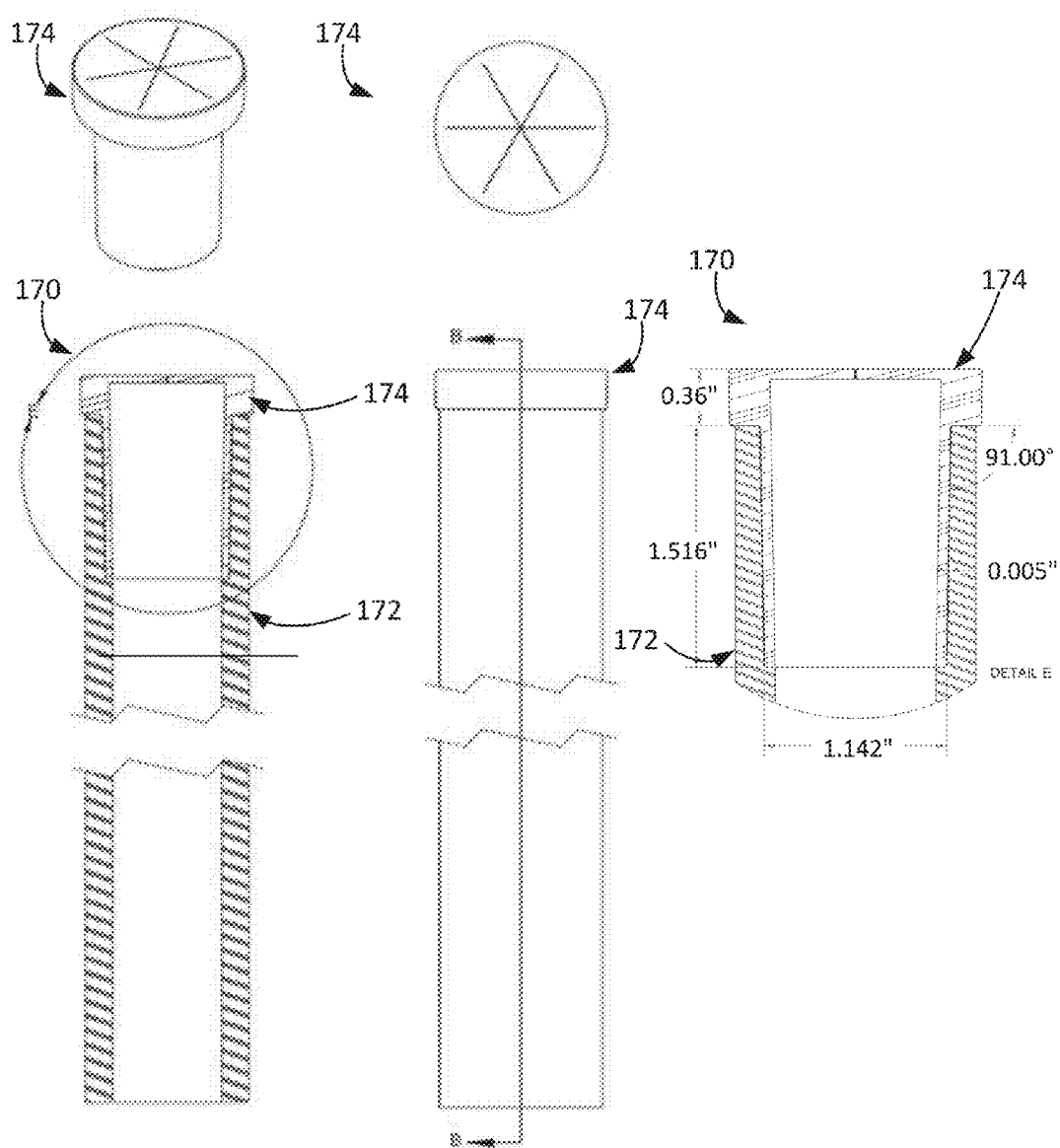
Figure 18:
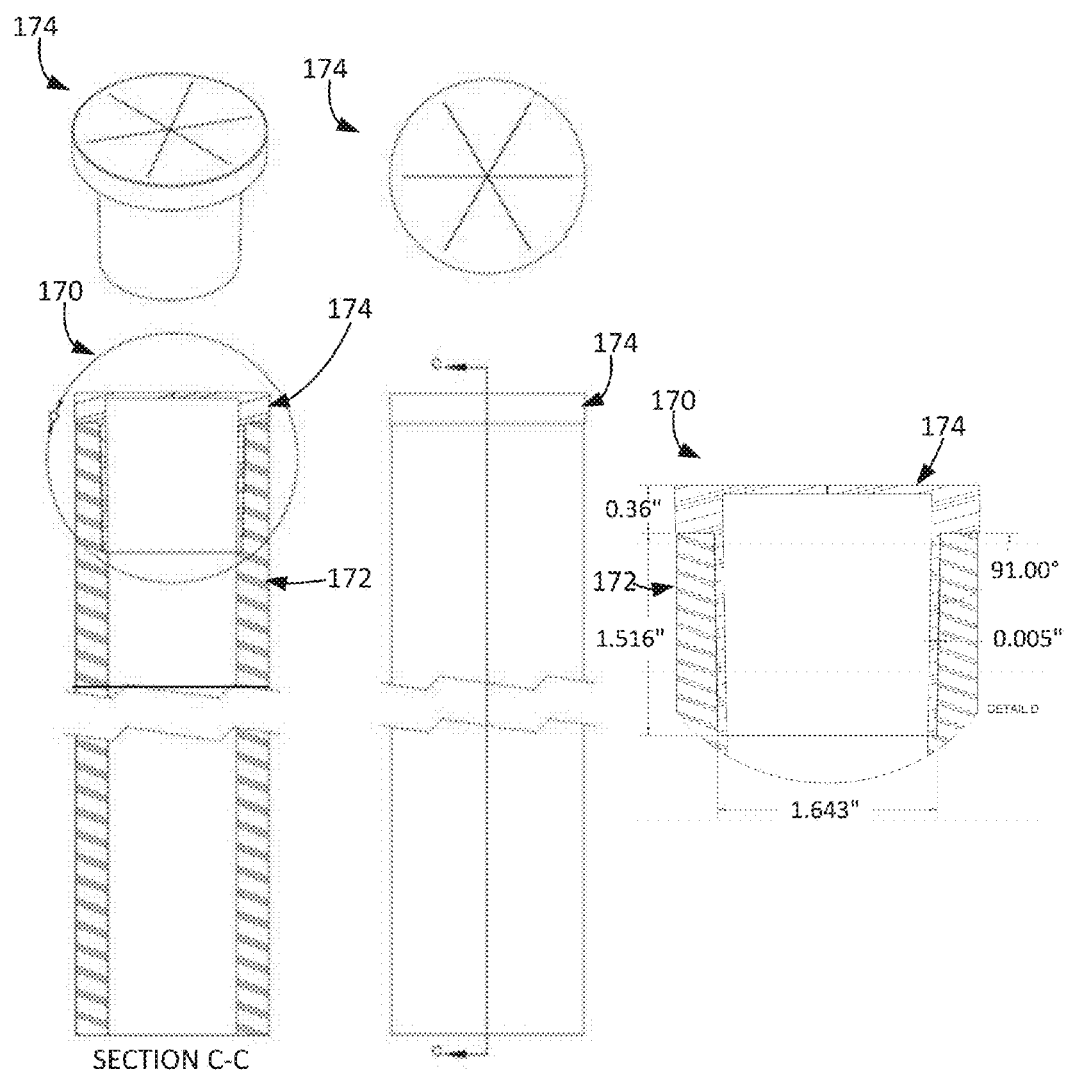

As described herein, the exemplary vent apparatus may be configured to allow gas to flow into and out of the cavity of a mold with substantially the same, or equal amount of, restriction. In at least this embodiment, the valve region 158 of the secondary tube portion 150 may provide the airflow functionality described herein. For example, the valve region 158 may define one or more, or a plurality of openings/apertures (e.g. slits) to, e.g., provide airflow through the vent tube (e.g., from inside the mold to outside of the mold, and vice versa). The number of slits may vary, although one or more configurations or numbers of slits may be advantageous over others. For example, two cross slits from edge to edge may be used (e.g., forming an "X" as shown in FIG. 5, three slits extending across the flat end cap may be used (e.g., equally spaced as shown in FIGS. 16-18), four or more slits may be provided from edge to edge, slits may extend only partially across the flat end cap (e.g., at the center thereof, off centered, etc.), other patterns of slits may be defined therein, etc.

In the embodiment depicted in FIG. 12, the valve region 158 of the secondary mold portion 150 may be perpendicular to an axis 156 along which the vent apparatus 100 extends. The valve region 158 may further define a surface 154 (e.g., flat end cap) that is also flat, or planar, (e.g., flat end cap) that is normal to the axis 156 of the vent apparatus 100. It may be described as a flat cap at the top of the secondary tube portion 150. The flat, or planar, nature of the valve region 158 and/or surface 154 of the secondary tube portion 150 may provide two-way valve functionality that is not biased in either direction. For example, airflow may be restricted in either direction by the same amount of restriction. In other words, since the exemplary embodiments in FIGS. 12-18 each have a planar valve region 158 and surface 154 (e.g., flat end cap) defining openings or slits, each embodiment in FIGS. 12-18 may allow airflow in either direction in and out of the mold with the same impedance.

Further, since the inside diameter of the passageway 125 of vent tube portion 120 does not change within the addition of the secondary tube portion 150, airflow through the vent tube portion 120 is not restricted. In other words, the secondary tube portion 150 may not increase the inside diameter of the passageway 125 of the vent tube 120 such that the airflow normally provided by a vent tube portion 120 having the same diameter is maintained.

Figure 13:
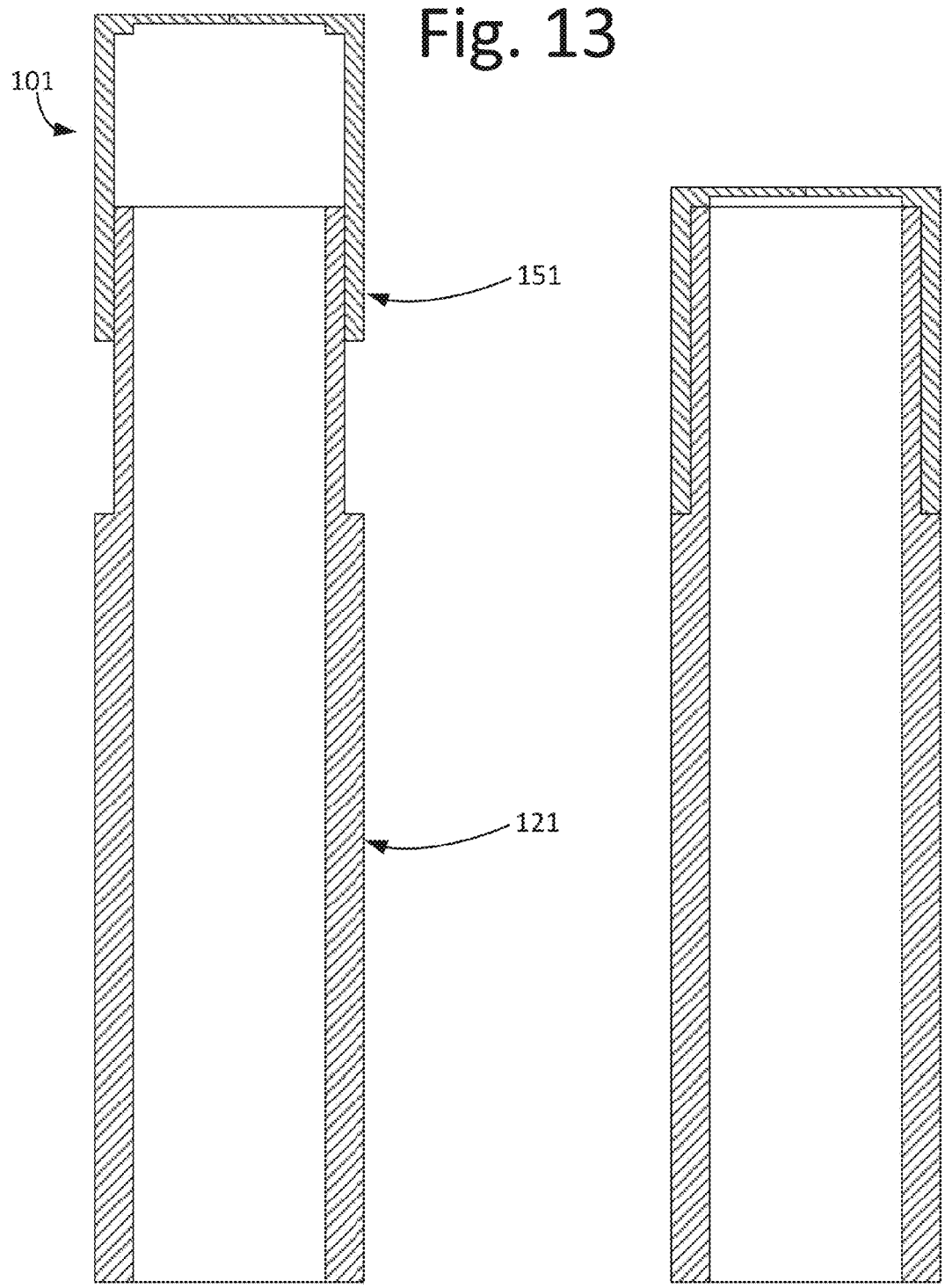
Figure 14:
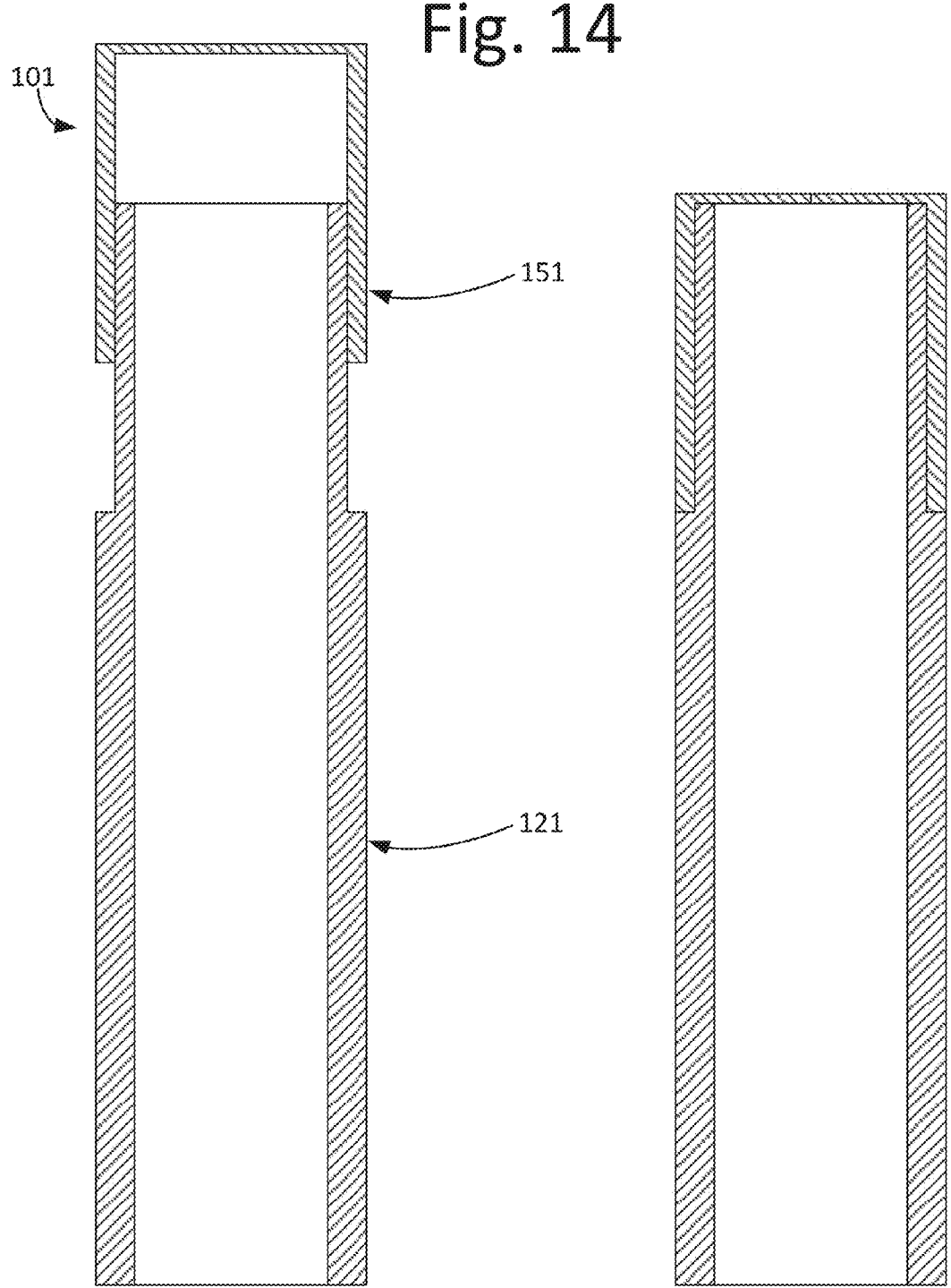
Figure 15:
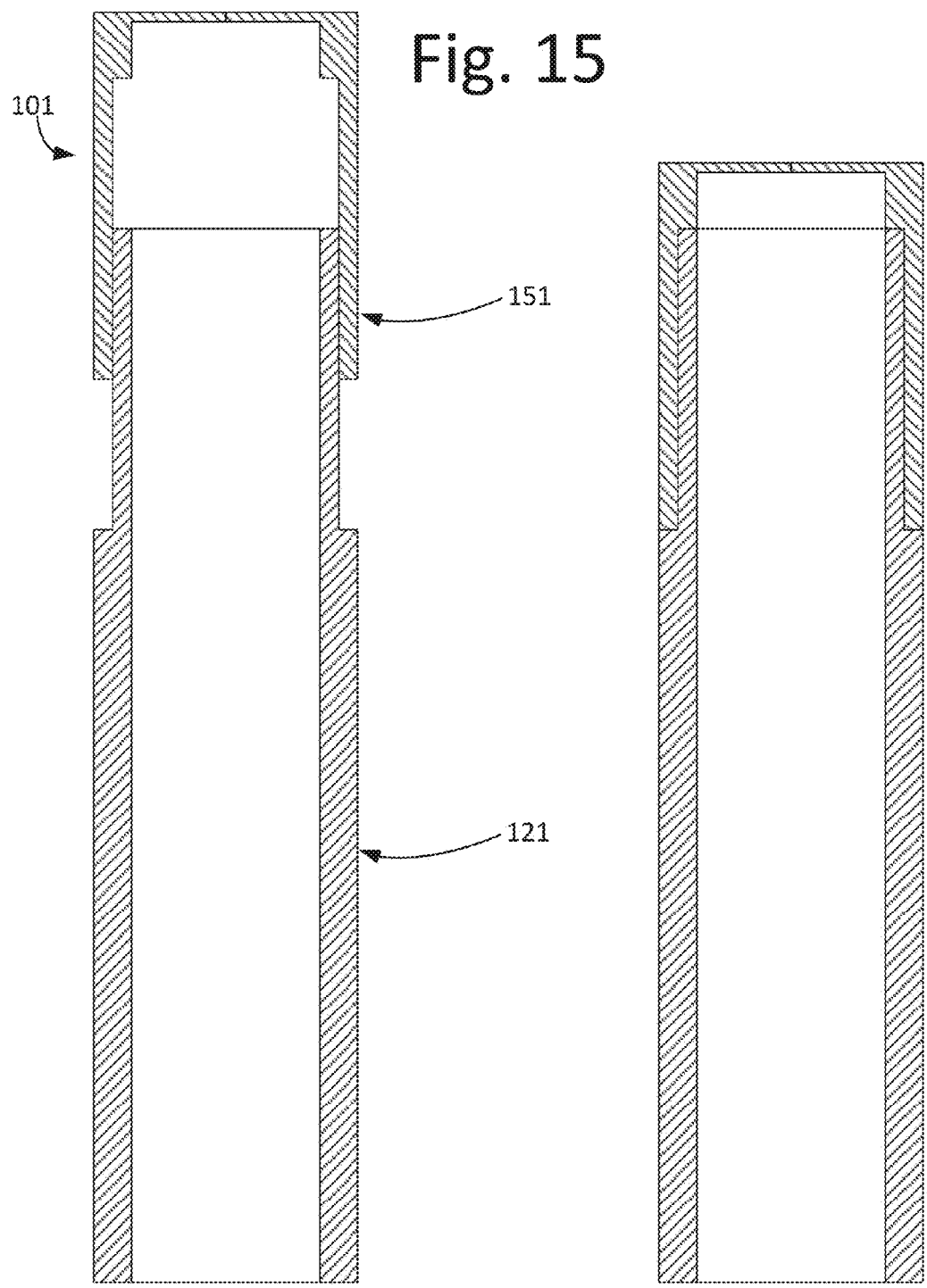

FIGS. 13-15 depict additional exemplary vent apparatus 101 where a secondary tube portion 151 may be located around the outside of the vent tube portion 121. As shown, the secondary tube portion 151 may not increase the outside diameter of the vent tube portion 121 such that the vent tube portion 121 may still be inserted in a vent opening of a mold. The valve region 161 of the secondary tube portion 151 may take any number of forms described herein (e.g., flat end cap with slits, membranes configured to melt, or burn off, openings, etc.). As shown in FIG. 13, the vent tube portion 121 may define an outer surface 123 upon which the secondary tube portion 151 may be mated or coupled to (e.g., around the outer surface 123).

FIGS. 16-18 depict additional exemplary vent apparatus 170 where a secondary tube portion 174 is located inside the opening of the vent tube portion 172. Such embodiments showing the mating of the secondary tube portion with the vent tube portion may be similar to others described herein and will not be described in further detail. In the one or more embodiments, the secondary tube portions may mate, or fit within or around, the vent tube portion with an interference fit, or may include any further wall structures or deformations in the walls that may provide additional holding forces when the two portions are mated.

As described herein, during the rotational molding process, encapsulated gas, or air, within the mold may be heated during the "cooking" or "heating" process causing the gas, or air, to expand. During this gas expansion process, pressure may build within the mold cavity and the pressure may be relieved. The relief process may be accomplished using a vent tube that is located thru the wall of the mold allowing gasses within the mold to travel thru the tube and escape, and vice versa.

The flowable material that is placed, or located, into the mold (e.g., in the cavity of the mold) before the molding process begins may normally be in a powder form. If the vent tube was not covered or sealed (e.g., allowed to be a hollow tube) during the whole rotational molding process, flowable material may escape through the vent tube and spill out of the mold. Therefore, the end of the vent tube located inside the mold cavity may be covered (e.g., sealed as described herein) while the molding process begins to prevent flowable material spillage through the vent tube.

As the mold heats up, the flowable material within the mold begins to melt, become somewhat of a "plasma"-type of material, and begin layering itself on the interior walls of the mold. At this point, the flowable material is no longer in powder form and the opportunity for spillage through the vent tube may have diminished. At the same time, a membrane (e.g., such as one or more membrane regions described herein) placed, or located, on the end or towards the end of the vent tube may also melt due to the heat and may allow the encapsulated gasses, or air, inside of the mold cavity to escape. Additionally, as described herein, exemplary vent apparatus may be configured to allow airflow into and out of a mold cavity (e.g., after the membrane regions melt). Further, the exemplary vent apparatus may also be configured to act as a stop valve for flowable material (e.g., resin) before the flowable material coalesces to walls of a mold cavity (e.g., before the membrane regions melt).

Figure 19:
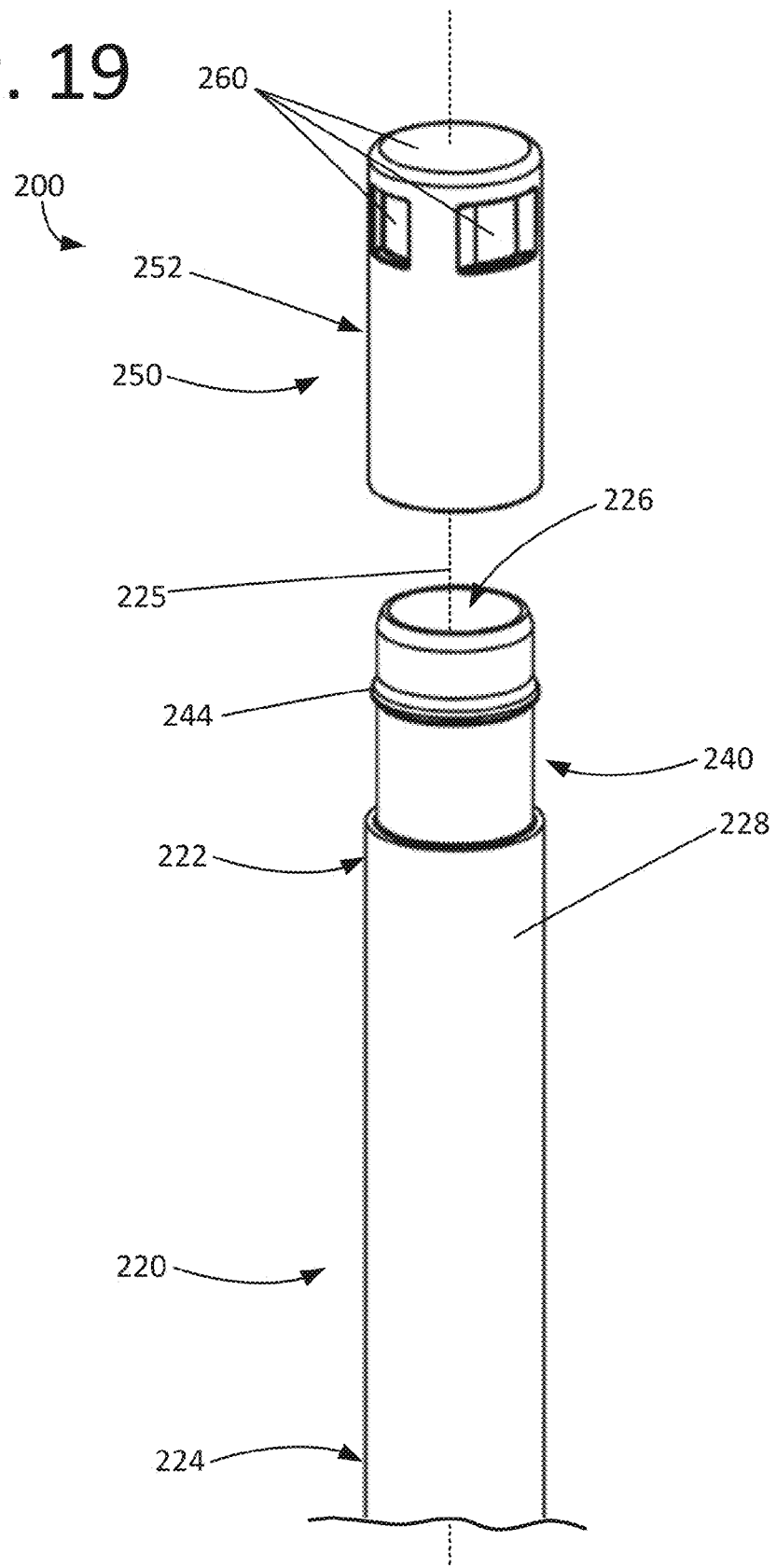
FIG. 19 is a perspective view of another exemplary vent apparatus.

Another exemplary vent apparatus 200 (e.g., which uses regions present during parts of the molding process but which melt away and are no longer present during other parts of the molding process) for use in a mold is depicted in FIG. 19. The vent apparatus 200 may include a vent tube portion 220 and a secondary tube portion 250. The secondary tube portion 250 may be configured to mate with the vent tube portion 220 to seal (e.g., selectively seal) a passageway of the vent tube portion 220.

The vent tube portion 220 may be configured to be located inside the opening a mold extending into the cavity of the mold. The vent tube portion 220 may extend from a first end portion 222 to a second end portion 224 along an axis 225. The vent tube portion 220 may define a passageway 226 extending from the first end portion 222 to the second end portion 224. Additionally, the vent tube portion 220 defines an outer surface 228 and an inner surface 229. As shown, the vent tube portion 220 is generally cylindrically shaped along the axis 225.

Figure 20:
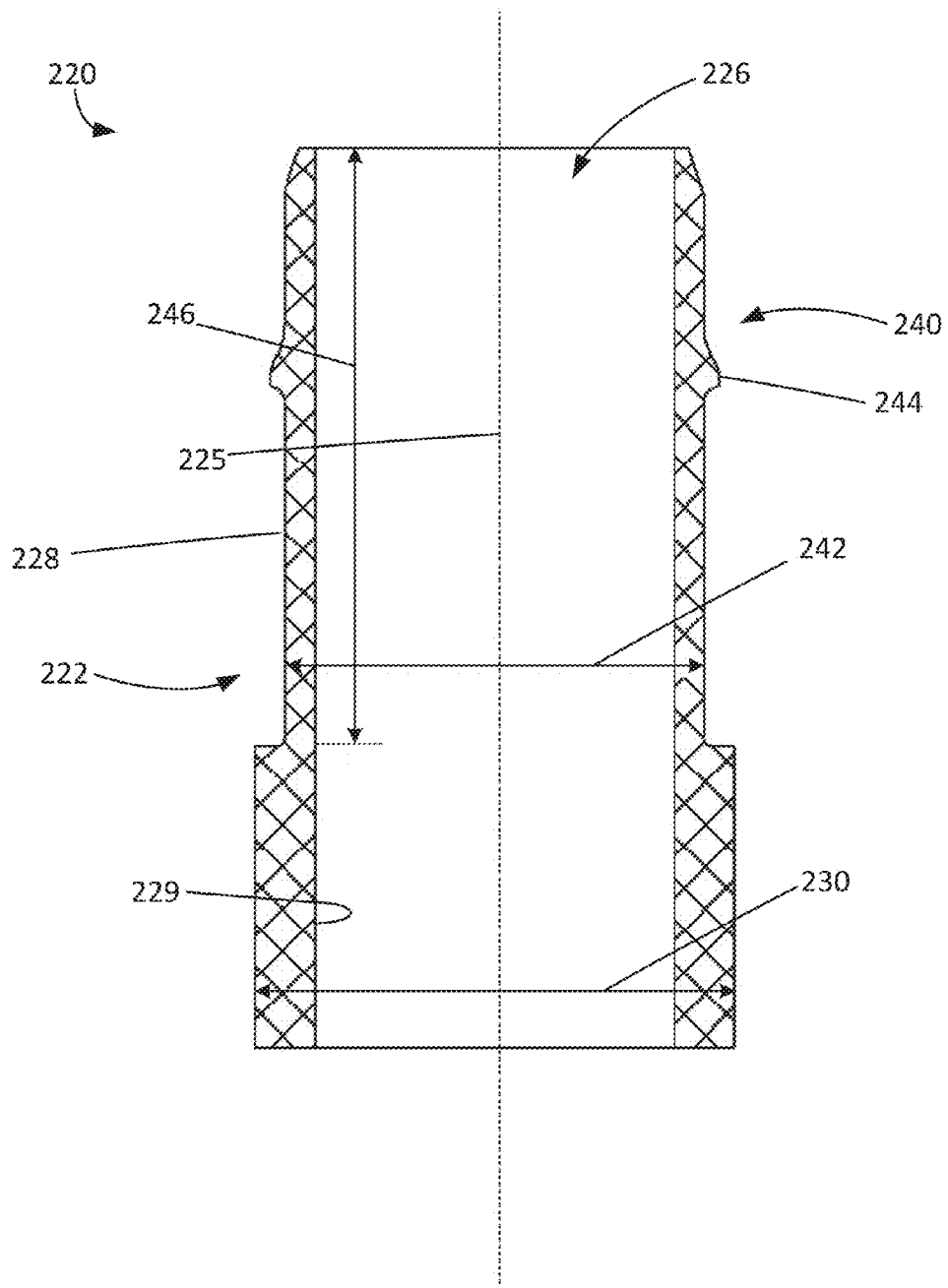
FIG. 20 is a cross-sectional view of an exemplary vent tube portion of the vent apparatus of FIG. 19.

As shown in FIG. 20, the vent tube portion 220 may define a vent tube outer diameter 230 that may be various sizes due to physical size of the items being molded. Larger diameter vent tube portions 220 may be required on larger volume molds to allow a larger quantity of encapsulated air to escape. If too small of a vent tube portion 220 is used, air may not escape fast enough leaving the mold pressurized, which may cause air to escape out of the mold in areas not intended, leaving small holes in the plastic item being molded. The vent tube diameter 230 may be about 0.5 inches to about 4 inches such as, e.g., about 0.75 inches, about 1 inch, about 1.25 inches, about 1.5 inches, about 1.75 inches, about 2 inches, about 2.5 inches, about 3 inches, about 4 inches, etc.

The first end portion 222 of the vent tube portion 220 may define a mating region 240 configured to mate with the secondary tube portion 250. The mating region 240 may have a mating region outer diameter 242 that is less than the vent tube outer diameter 230. Additionally, the mating region 240 may define a mating region length 246 extending parallel to the axis 225 (e.g., a length that is less than a distance of the secondary tube portion 250 from the most proximal membrane region defined by the secondary tube portion 250 to the proximal end thereof).

The first end portion 222 may further define an annular protrusion 244 extending radially from the outer surface 228. The annular protrusion 244 may be configured to engage the secondary tube portion 250 when the secondary tube portion 250 is mated to the first end portion 222. Any other engaging structure may be added to the first end portion 222 or to the secondary tube portion 250 (e.g., the inner surface thereof) to assist in retaining the secondary tube portion 250 on the first end portion 222 (e.g., burrs, indents, radial structures, etc.).

The secondary tube portion 250 may be configured to mate with the first end portion 222 (e.g., mating region 240 of the first end portion 222) of the vent tube portion 220 to seal the passageway 226 proximate, or at, the first end portion 222. One or more membrane regions 260 of the secondary tube portion 250 may be configured to melt, or burn off, during a mold process to unseal, or open, the passageway 226 thereby allowing airflow through the passageway 226 either out of the mold cavity or into the mold cavity. As shown, the secondary tube portion 250 may include more than one membrane regions 260 (e.g., a plurality of membrane regions 260).

The secondary tube portion 250 may include or be formed of one or more materials such as, e.g., polypropylene, polyethylene, and/or any other material (e.g., such as a polymer) with similar thermal properties to that of which is being molded, etc. In at least one embodiment, the secondary tube portion 250 may be formed, or manufactured, using injection molding.

The membrane regions 260 may define a thickness that is less than the wall thickness of the remainder of the secondary tube portion 250. The thickness of the membrane regions 260 may depend on the article being formed in the mold. For example, thicker molded articles may require more flowable material, more heat, and/or more time to process. As such, the membrane regions 250 may need to be different thickness such that they melt, or burn off, at the appropriate time for the appropriate molded article.

In other words, due to physical size of parts and the amount of flowable material, or plastic powder, that may be required to "melt" within the mold, various thicknesses of membrane regions 260 may be required. This may be due to the amount of heat and time that may be required to melt larger quantities of flowable material. For example, if the membrane regions 260 are too thin, the membrane regions 260 may melt before the flowable material is melted causing flowable material to leak thru the vent tube portion 220. If the membrane regions 260 are too thick, the membrane regions 260 may not melt at all causing the entrapped air to escape out of the mold in areas not intended leaving small holes in the article being molded.

For example, the membrane regions 260 may have a thickness of about 0.001 inches to about 0.010 inches such as, e.g., about 0.001 inches, about 0.002 inches, about 0.003 inches, about 0.004 inches, about 0.005 inches, about 0.006 inches, about 0.007 inches, about 0.008 inches, about 0.009 inches, about 0.010 inches, etc. Additionally, each of the membrane regions 260 may not have the same thickness. In other words, some membrane regions 260 may have different thicknesses than others.

Figure 21:
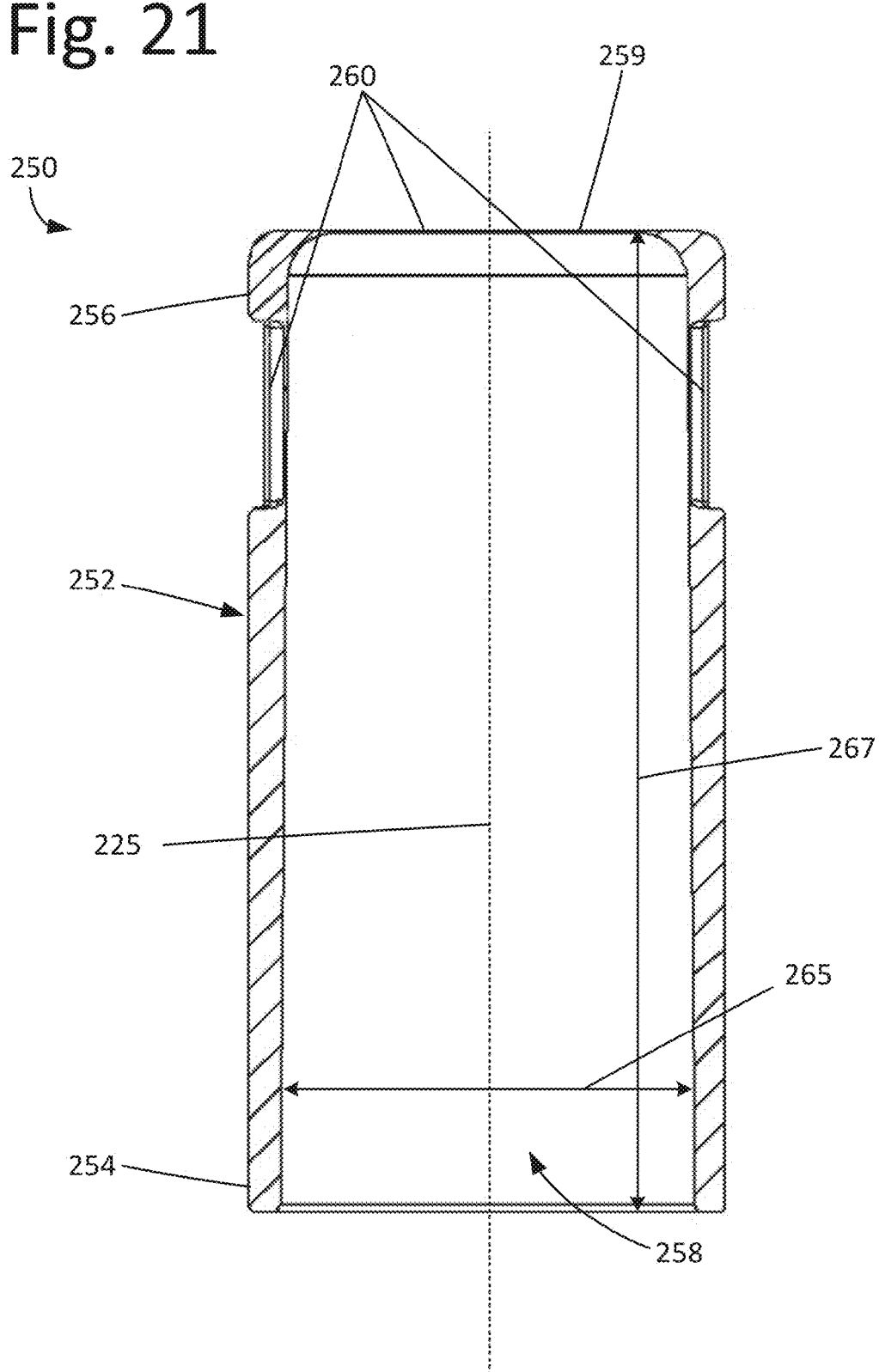
FIG. 21 is a cross-sectional view of an exemplary secondary tube portion of the vent apparatus of FIG. 19.

As shown in FIG. 21, the secondary tube portion 250 may be described as including a cylindrical body 252 extending from a proximal end portion 254 to a distal end portion 256 and defining a channel 258 from the proximal end 254 portion to the distal end portion 256. An end surface portion 259 of the secondary tube portion 250 may cover the channel 258 at the distal end portion 252. As shown, the end surface portion 259 may include a membrane region 260.

The orientation of the membrane regions 260 may be described in terms of the axis 225. For example, membrane regions 260 may extend perpendicular or parallel to the axis 225. As shown, the membrane region 260 of the end surface portion 259 (e.g., an end membrane) is perpendicular to the axis 225. Further, the cylindrical body 252 may define one or more membrane regions 260 (e.g., one or more body membranes). As shown, the membrane regions 260 defined by the body 252 are parallel to the axis 225. In one or more embodiments, the end surface portion 259 includes only a membrane region at the center thereof (e.g., such a membrane region being suspended from portions of the body, such a membrane being a flat membrane with no other features or structure providing support therefore, such a membrane region covering an area greater than 50 percent of an inner cross-section area of the secondary tube portion 250 taken perpendicular to the axis 225, such a membrane region covering an area greater than 60 percent of an inner cross-section area of the secondary tube portion 250 taken perpendicular to the axis 225, such a membrane region covering an area greater than 80 percent of an inner cross-section area of the secondary tube portion 250 taken perpendicular to the axis 225, etc.).

Including one or more membrane regions (e.g., primary and/or auxiliary) at different orientations relative to one another (e.g., orthogonal or at any other angle relative to each other) and/or at different locations (e.g., cylindrical body locations versus end locations) may provide additional benefits. For example, there may be times when a membrane region (e.g., the end membrane) may not melt completely or effectively. With use of additional or multiple membrane regions at different orientations relative to one another and/or at different locations, the effects from one membrane region not completely melting are reduced.

Figure 22:
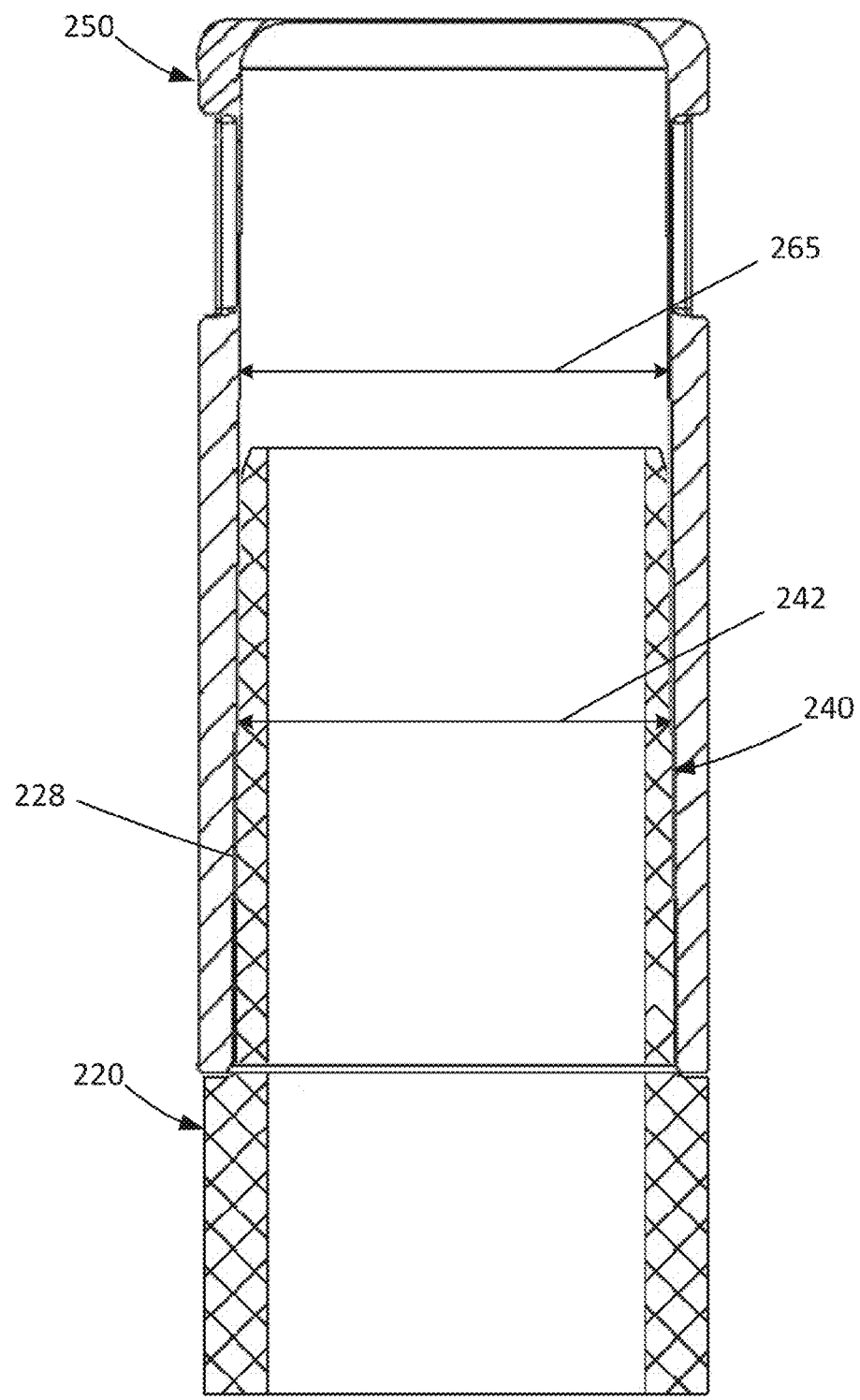
FIG. 22 is a cross-sectional view of the vent tube portion and the secondary tube portion coupled (e.g., mated) together.

The secondary tube portion 250 is shown mated with the vent tube portion 220 in FIG. 22. As shown, the secondary tube portion 250 may extend over at least a portion of the outer surface 228 of the vent tube portion 220. For example, the secondary tube portion 250 may extend over a portion of the first end portion 222, or more specifically, the mating region 240.

The mating region 240 and the secondary tube portion 250 may be sized with respect to each to provide coupling therebetween. For example, the secondary tube portion 250 may define a secondary tube portion length 267 that is longer than the mating region length 246. Further, for example, the secondary tube portion 250 may define a secondary tube portion inner diameter 265 that is greater than or equal to the mating region outer diameter 242.

The mating between the secondary tube portion and the vent tube portion may be accomplished with any other mating configurations described herein. For example, the secondary tube portion may extend within at least a portion of the inner surface 229 of the vent tube portion 220 (e.g., extend within and along at least a portion of the inner surface of the vent tube portion such as shown in the embodiment of FIG. 12 or FIG. 16).

The membrane regions 260 may be sized in terms of the area of passageway 226 of the vent tube portion 250 and/or of the channel 258 of the secondary tube portion 250. For example, each of the passageways 226 of the vent tube portion 250 and the channel 258 of the secondary tube portion 250 may be described as defining an inner cross-section area taken perpendicular to the axis 225. Further, each of the one or more membrane regions 260 may be described as defining an area along which the membrane region 260 lies (e.g. a planar area in the case of the membrane region defined by the end surface portion 259, an area of an arc in the case of the membrane regions defined in the cylindrical body parallel to axis 225, etc.). A combined area of all of the areas of the one or more membrane regions 260 may be greater than the inner cross-section area of either of the passageway 226 or the channel 258 taken orthogonal to the axis 225.

The complete disclosure of the patents, patent documents, and publications cited in the background, the detailed description of exemplary embodiments, and elsewhere herein are incorporated by reference in their entirety as if each were individually incorporated.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein.

What is claimed is:

1. Method of assembling a mold defining an opening comprising:
    providing a vent tube portion extending from a first end portion to a second end portion along an axis, wherein the vent tube portion defines an inner surface and an outer surface and the inner surface defines a passageway extending from the first end portion to the second end portion;
    coupling a secondary tube portion to the first end portion of the vent tube portion to seal the passageway proximate the first end portion, wherein the secondary tube portion defines one or more membrane regions located outside of the passageway of the vent tube portion and configured to melt during a mold process to unseal the passageway, wherein the vent tube portion defines a vent tube outer diameter, wherein the first end portion of the vent tube portion defines a mating region configured to be coupled to the secondary tube portion that defines a mating region outer diameter that is less than the vent tube outer diameter; and
    locating the vent tube portion in the opening of the mold such that the vent tube portion extends through the opening of the mold and the first end portion of the vent tube portion is located within the mold.

2. The method of claim 1, wherein the mating region defines a mating region length extending along the axis, wherein the secondary tube portion defines a secondary tube portion length that is longer than the mating region length to position the one or more membrane regions outside of the passageway of the vent tube portion.

3. The method of claim 1, wherein the first end portion of the vent tube portion defines an annular protrusion extending radially from the outer surface of the vent tube portion configured to engage the secondary tube portion when the secondary tube portion is coupled to the first end portion.

4. The method of claim 1, wherein the one or more membrane regions of the secondary tube portion comprise at least one membrane region extending parallel to the axis when the secondary tube portion is coupled to the first end portion.

5. The method of claim 1, wherein the one or more membrane regions of the secondary tube portion comprise at least one membrane region extending perpendicular to the axis when the secondary tube portion is coupled to the first end portion.

6. The method of claim 1, wherein the secondary tube portion comprises a cylindrical body extending from a proximal end portion to a distal end portion and defining a channel from the proximal end portion to the distal end portion, wherein the secondary tube portion further comprises an end surface portion covering the channel at the distal end portion, wherein the end surface portion defines a membrane region of the one or more membrane regions.

7. The method of claim 1, wherein the secondary tube portion extends over at least a portion of the outer surface of the vent tube portion when coupled to the vent tube portion.

8. The method of claim 1, wherein the secondary tube portion defines a secondary tube portion length that is longer than about 0.36 inches.

9. The method of claim 1, wherein the one or more membrane regions of the secondary tube portion comprise a plurality of membrane regions.

10. Method of assembling a mold defining an opening comprising:
    providing a vent tube portion extending from a first end portion to a second end portion along an axis, wherein the vent tube portion defines an inner surface and an outer surface and the inner surface defines a passageway extending from the first end portion to the second end portion;
    coupling a secondary tube portion to the first end portion of the vent tube portion to seal the passageway proximate the first end portion, wherein the secondary tube portion defines one or more membrane regions configured to melt during a mold process to unseal the passageway, wherein the one or more membrane regions of the secondary tube portion comprise a first membrane region extending parallel to the axis and a second membrane region extending perpendicular to the axis when the secondary tube portion is coupled to the first end portion; and
    locating the vent tube portion in the opening of the mold such that the vent tube portion extends through the opening of the mold and the first end portion of the vent tube portion is located within the mold.

11. The method of claim 10, wherein the first end portion of the vent tube portion defines a mating region to be coupled to the secondary tube portion, wherein the mating region defines a mating region length extending along the axis, wherein the secondary tube portion defines a secondary tube portion length that is longer than the mating region length.

12. The method of claim 10, wherein the vent tube portion defines a vent tube outer diameter, wherein the first end portion of the vent tube portion defines a mating region configured to be coupled to the secondary tube portion that defines a mating region outer diameter that is less than the vent tube outer diameter.

13. The method of claim 10, wherein the first end portion of the vent tube portion defines an annular protrusion extending radially from the outer surface of the vent tube portion configured to engage the secondary tube portion when the secondary tube portion is coupled to the first end portion.

14. The method of claim 10, wherein the secondary tube portion comprises a cylindrical body extending from a proximal end portion to a distal end portion and defining a channel from the proximal end portion to the distal end portion, wherein the secondary tube portion further comprises an end surface portion covering the channel at the distal end portion, wherein the end surface portion defines the second membrane region of the one or more membrane regions.

15. The method of claim 10, wherein the secondary tube portion extends over at least a portion of the outer surface of the vent tube portion when coupled to the vent tube portion.

16. The method of claim 10, wherein the secondary tube portion defines a secondary tube portion length that is longer than about 0.36 inches.

17. Method of assembling a mold defining an opening comprising:
  providing a vent tube portion extending from a first end portion to a second end portion along an axis, wherein the vent tube portion defines an inner surface and an outer surface and the inner surface defines a passageway extending from the first end portion to the second end portion;
  coupling a secondary tube portion to the first end portion of the vent tube portion to seal the passageway proximate the first end portion, wherein the secondary tube portion defines one or more membrane regions located outside of the passageway of the vent tube portion and configured to melt during a mold process to unseal the passageway, wherein the first end portion of the vent tube portion defines a mating region to be coupled to the secondary tube portion, wherein the mating region defines a mating region length extending along the axis, wherein the secondary tube portion defines a secondary tube portion length that is longer than the mating region length to position the one or more membrane regions outside of the passageway of the vent tube portion; and
  locating the vent tube portion in the opening of the mold such that the vent tube portion extends through the opening of the mold and the first end portion of the vent tube portion is located within the mold.

18. Method of assembling a mold defining an opening comprising:
  providing a vent tube portion extending from a first end portion to a second end portion along an axis, wherein the vent tube portion defines an inner surface and an outer surface and the inner surface defines a passageway extending from the first end portion to the second end portion;
  coupling a secondary tube portion to the first end portion of the vent tube portion to seal the passageway proximate the first end portion, wherein the secondary tube portion defines one or more membrane regions located outside of the passageway of the vent tube portion and configured to melt during a mold process to unseal the passageway, wherein the first end portion of the vent tube portion defines an annular protrusion extending radially from the outer surface of the vent tube portion configured to engage the secondary tube portion when the secondary tube portion is coupled to the first end portion; and
  locating the vent tube portion in the opening of the mold such that the vent tube portion extends through the opening of the mold and the first end portion of the vent tube portion is located within the mold.

19. Method of assembling a mold defining an opening comprising:
  providing a vent tube portion extending from a first end portion to a second end portion along an axis, wherein the vent tube portion defines an inner surface and an outer surface and the inner surface defines a passageway extending from the first end portion to the second end portion;
  coupling a secondary tube portion to the first end portion of the vent tube portion to seal the passageway proximate the first end portion, wherein the secondary tube portion defines one or more membrane regions located outside of the passageway of the vent tube portion and configured to melt during a mold process to unseal the passageway, wherein the secondary tube portion extends over at least a portion of the outer surface of the vent tube portion when coupled to the vent tube portion; and
  locating the vent tube portion in the opening of the mold such that the vent tube portion extends through the opening of the mold and the first end portion of the vent tube portion is located within the mold.

20. Method of assembling a mold defining an opening comprising:
  providing a vent tube portion extending from a first end portion to a second end portion along an axis, wherein the vent tube portion defines an inner surface and an outer surface and the inner surface defines a passageway extending from the first end portion to the second end portion;
  coupling a secondary tube portion to the first end portion of the vent tube portion to seal the passageway proximate the first end portion, wherein the secondary tube portion defines one or more membrane regions located outside of the passageway of the vent tube portion and configured to melt during a mold process to unseal the passageway, wherein the secondary tube portion defines a secondary tube portion length that is longer than about 0.36 inches, wherein the secondary tube portion extends within and along at least a portion of the inner surface of the vent tube portion; and
  locating the vent tube portion in the opening of the mold such that the vent tube portion extends through the opening of the mold and the first end portion of the vent tube portion is located within the mold.

* * * * *